Patented Sept. 9, 1930

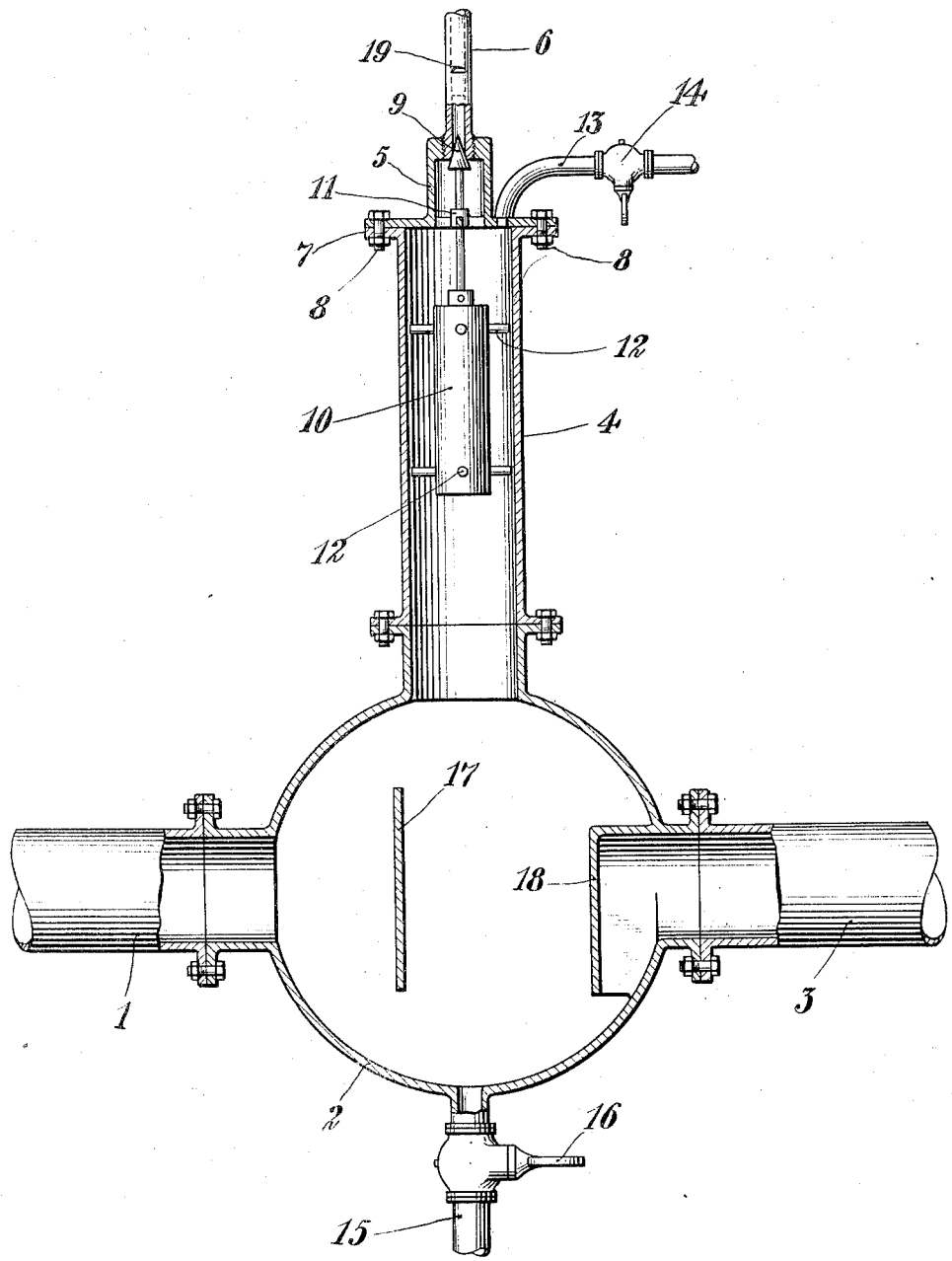

1,775,362

UNITED STATES PATENT OFFICE

WALTER S. DEMARCUS, OF NEW YORK, N. Y.; R. T. DE MARCUS ADMINISTRATOR OF SAID WALTER S. DEMARCUS, DECEASED

SEPARATOR

Application filed September 3, 1927. Serial No. 217,317.

My invention relates to an improvement in separators, and particularly separators for removing gases and other substances from liquids used in industry for the purpose of purifying said liquids and preventing said liquids from corroding or otherwise damaging the conduits and containers for same.

An object of my invention is to provide a simple and inexpensive apparatus and method for separating air and other gases, oil and other impurities from water and thus obviating the losses due to corrosion and other chemical action in pipes, boilers and other machinery for heating and power plants. It is well known that pure water for instance, when brought into contact with iron or another metal will not cause rusting; while on the other hand, water in which a lot of air is carried in solution will quickly rust any metal surfaces with which it comes into contact. Water containing air now causes great losses in numerous installations and frequently requires renewal of systems of piping, boilers and similar vessels and conduits at frequent intervals. To prevent the loss and additional expense due to the action of water carrying air, is the main result which my invention aims to secure.

The further object of my invention is to provide a simple device which can be attached to any conduit or container and which is capable of so treating the water that the air, oil and other substances carried by it will be quickly and efficaciously separated and removed; the air which on account of its lightness, rises after being extracted from the water being at once discharged without risk of admission of additional air, in a manner that is controlled by the action of the water or other liquid itself.

Further objects and advantages of this invention will appear from the following description, taken with the drawings which disclose a preferred embodiment of my invention. But the construction herein set forth is of course, illustrative only and I may resort to variations in matters of design without departing from the principle which underlies the invention.

On the drawings, the figure is a sectional view through a device shown more or less diagrammatically, by which my invention can be practiced.

In the particular description of the drawings, the numeral 1 indicates a conduit through which liquid can be conducted to a hollow vessel 2 and the numeral 3 indicates a similar conduit, by which the water or other liquid is conducted away after passing through the chamber enclosed by the vessel 2. The conduits 1 and 3 can be connected to the globular vessel 2 in any suitable manner by joints or couplings, or the three parts mentioned may be made in one piece if desired. From the top of the vessel 2 rises a discharge tube 4 and the upper end of this discharge tube 4 is closed by a head 5 having a vent opening leading to a vent pipe 6. Both the head 5 and adjacent end of the tube 4 have flanges 7 so that the head and tube can be bolted together as at 8 and any kind of packing may be employed to make the joint between the tube and head leak proof.

The vent opening leading to the pipe 6 is opened and closed by a cone-shaped valve 9 attached by a suitable stem to a float 10 in the tube 4 and the stem of this valve between the valve itself and the float, moves in a bearing 11 fixed to the inside of the head 5 in any suitable manner. The valve 10 which can be of any kind of material lighter than water or whatever liquid is flowing through the vessel 2 has guide projections 12 extending out from the sides in sufficient number to keep this float which may be somewhat elongated in form in line with the axis of the tube 4, freely engaging the interior thereof and thus insuring freedom of movement of the stem of the valve in the bearing 11. To the head 5 is also secured a second vent pipe 13 having a controlling valve 14. This vent pipe 13 likewise communicates with the interior of the tube 4. At the bottom of the vessel 2 is a drain 15 controlled by a drain cock 16.

Within the vessel 2 in line with the inlet through which water enters from the conduit 1 and with the outlet through which water flows out by way of the conduit 3 is a member for retarding the flow of the water through the chamber within the vessel 2, this member being in the form of a deflector or baffle plate 17. It is fixed within the vessel 2 below the discharge tube 4 and in position to obstruct somewhat the water flowing into the vessel 2 from the conduit 1. Obviously, when water enters it strikes the deflector plate 17 and must flow either over or under it. In so doing the lighter air or other gas dissolved or carried in the water is separated from the stream and rises in the vessel 2. So long as the level of the water is high enough to act upon the float 10 and hold the valve 9 up so as to close the tube 6 the air cannot escape but it will naturally rise as high as it is permitted to go and will collect in the top of the discharge tube 4. The more air that collects in this tube the lower will the level of the water be forced down therein and finally the float will then sink enough to pull the valve 9 to open position. Then all of the air will escape through the vent pipe 6. By the action of the deflector 17 and the float controlled valve 9, then, the air separated from the stream of water flowing through the vessel 2 will be periodically released as often as is necessary and the liquid which flows out through the conduit 3 will no longer have any air or other gas in it. The presence of the float 10 which is lifted by the water so that the vent pipe 6 will be normally closed until sufficient air has collected in the upper end of the discharge tube 4 to force the level of the liquid therein down enough to open the valve 9 insures the keeping of the vent pipe 6 closed for the greater part of the time and thus prevents the liquid from overflowing and escaping from the device. The plate 17 is preferably supported at both ends in the vessel 2.

This apparatus and method is of course, not only adapted for the removal of gases from water, but for the separation of gases from any kind of liquid; and it is particularly useful for heating of power plants on ship board and for places such as are found in the supply pipes of boilers because water supplied to boilers and other heating and power plants always contains air and the air quickly oxidizes and rusts the inside surfaces of the pipes and conduits of such installations especially at the operating temperatures employed. Thus, the boilers and pipes soon become rusty and corroded and not only have to be cleaned frequently at the cost of much labor and expense, but wear out in a relatively short time and have to be replaced. The invention is likewise adapted for the heating and power plants of houses and factories.

Should the liquid passing through the vessel 2 contain oil and other impurities or gases such as air, the other impurities will sink to the bottom of the vessel 2 and can be removed by way of the drain 15. Lighter oil and other impurities which will float upon the water will naturally rise in the tube 4 and from time to time can be released and discharged through the vent 13. With the structure as shown in the drawings, the conduit 1 can then be connected to the supply pump of a boiler and this pump will force the water through the vessel 2 under considerable pressure. Hence whenever the valve 14 is opened any light oil or other impurities in the upper end of the tube 4 will be discharged through the vent 13 with considerable force; and the same purging action will take place through the drain 15 if the valve 16 is opened.

I prefer to put over the outlet leading to the conduit 3 a shield or hood 18. This hood is secured to the inside of the vessel 2 along its top and sides so that all liquid flowing out of the vessel 2 through the conduit 3 must pass around the lower edge of the plate 18. This plate can be held in place in any suitable manner and of course, the vessel 2 need not be round or spherical but can have any other shape required.

I also show the vent pipe 6 provided with an alarm or whistle 19. Thus, whenever the valve 9 opens to release air from the top of the tube 4 this whistle or alarm will be heard as long as the air escapes; that is, the whistle will give one short blast after another as long as the water continues to flow through the vessel 2. But in case the vessel 2 is used on the supply line leading to a boiler and has the usual supply conduit 1 connected to the pump which draws the water from the supply tank there may be times when this supply tank will be empty, and with the pump working no water will then be flowing through the conduits 1 and 3 to the boiler, but air only will be forced through these conduits. This air is of course not desired in the boiler and whenever this state of affairs arises, no water being in the vessel 2 the valve 9 will be opened and then the whistle will blow continuously, thus warning the engineer that for the time being no water is passing through the conduit 3 and enabling the state of affairs to be at once corrected. This same safe guard will be afforded when the invention is used in connection with domestic water supply systems used on ships.

Since the water supplied to the vessel 2 is thus often under considerable pressure the air discharged through the vent 6 will likewise be under pressure, and as air under pressure can be used for various purposes I may connect the vent pipe 6 to an air reservoir. Then the air extracted from the water can be stored and utilized when required. This is another important feature of utility of my invention.

The invention can also be conveniently mounted at any high point in the discharge lines of water pumps. That is to say, the discharge tube 4 containing the float controlled valve 9 can be disposed in the discharge line of a water pump at any high point to effect the automatic removal of the air from such a line whenever the separation and extraction of the air is desirable. I can similarly use the tube 4 with the float controlled valve in the cover which is placed over the discharge valves of a water pump, or in the air drum mounted upon this cover and thus effect the separation and extraction of air in such installations also in the same way.

When the vent 6 is connected to an air reservoir, the vent 6 will have a check valve to prevent back flow of air into the tube 4; and the alarm 19 will be omitted.

If desired a screen can be put in the pipe 3, or omitted. The shield 18 of course cooperates with the deflector 17 to prevent the water from flowing through the vessel 2 before all the air and other substances in the liquid are extracted and detained in this vessel until discharged from same.

The vessel 2 may have a depression in its bottom around the opening to the drain 15 so that any sediment left by the water in the casing 2 may collect in this depression and be more conveniently removed through the drain 15.

I claim:

1. A separator comprising a vessel enclosing a chamber having an inlet and an outlet for liquid passing through the chamber, the inlet and outlet being at opposite ends of the vessel, a deflector member in the chamber adjacent the outlet, said member having its upper and lower edges spaced from the vessel to enable liquid entering the vessel to flow above and below it, a shield over the outlet secured to the vessel at all points except along its lower edge, and a discharge tube secured to the top of the vessel and located substantially between the said member and said shield, the discharge tube having an air vent and a float controlled valve in said tube to open and close said vent.

2. A separator comprising a vessel enclosing a chamber and having inlet and outlet conduits for liquid passing through the chamber, said inlet and outlet conduits being located at opposite sides of the vessel substantially in aligned relation on a line between the bottom and top portions of the vessel, a deflector in the interior of the vessel between the inlet and outlet conduits to cause the inflow of liquid to pass toward the top and bottom portions of the vessel, a discharge tube rising from the vessel adapted to receive liquid and air from the top portion of the vessel and provided with an air controlled valve to allow the escape of air, said outlet conduit extending inwardly into the interior of the vessel toward the deflector, and a shield partially closing the inner end of the outlet conduit and associated with the wall of the vessel so as to cause the outflow of water to pass upwardly into the outlet conduit in a direction from the bottom portion of the vessel.

In testimony that I claim the foregoing as my invention, I have signed my name hereto.

WALTER S. DEMARCUS.